Dec. 28, 1948.                    F. J. BOGARD                    2,457,770
                               LUBRICATING DEVICE
                             Filed Sept. 18, 1943
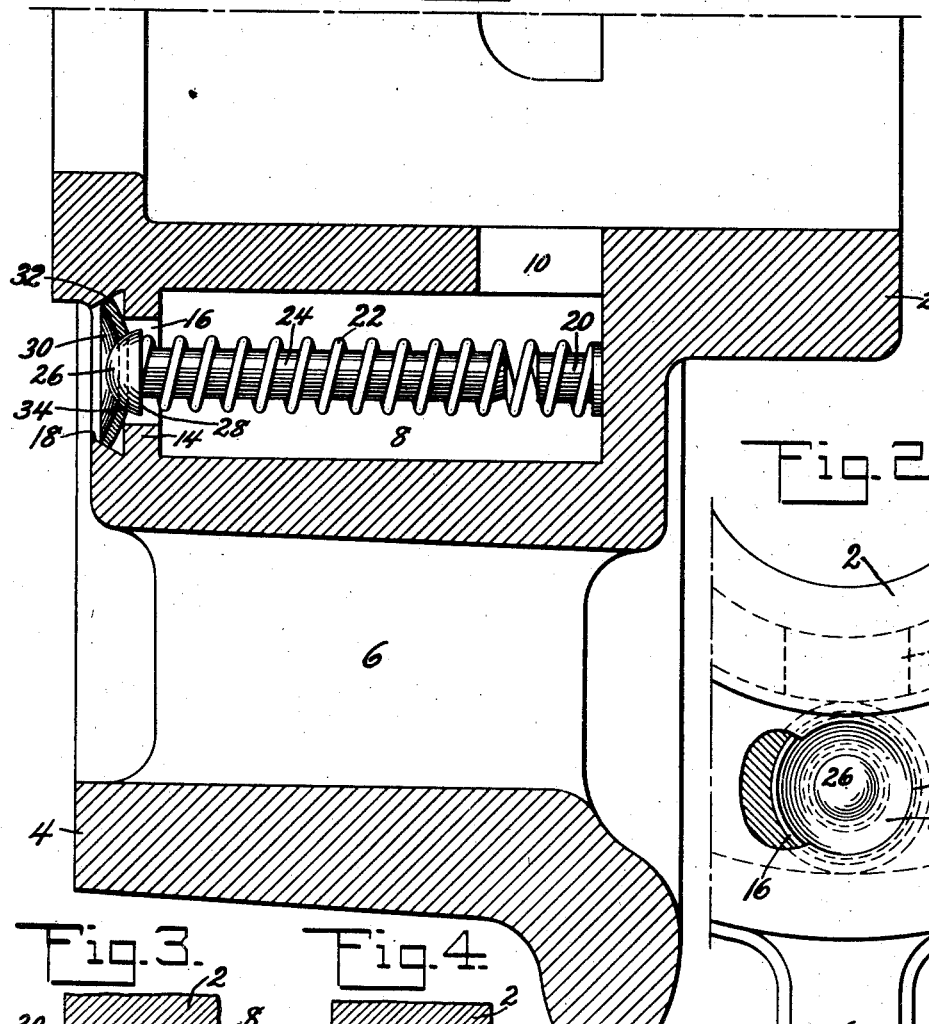
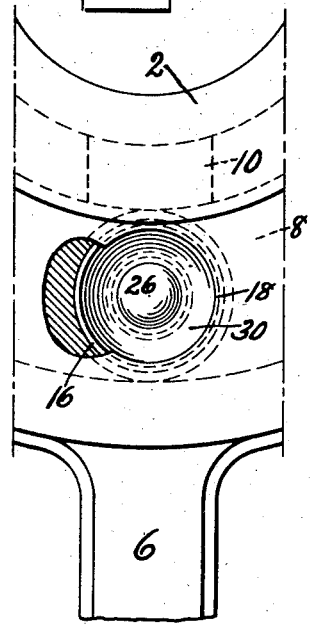
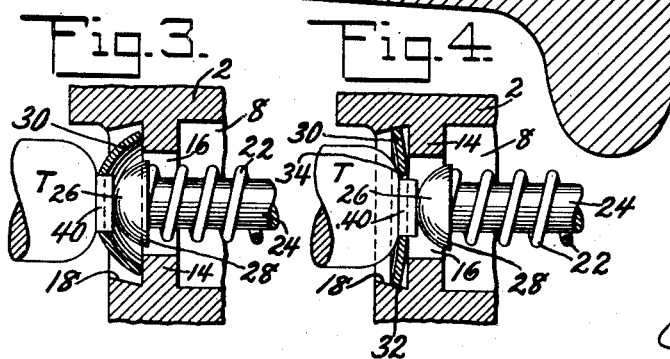
INVENTOR
*Fred J. Bogard*
BY
*Robert J. Shields*
ATTORNEY Patented Dec. 28, 1948

2,457,770

UNITED STATES PATENT OFFICE 2,457,770

LUBRICATING DEVICE

Fred J. Bogard, Huntington, W. Va., assignor to American Car and Foundry Company, New York, N. Y., a corporation of New Jersey Application September 18, 1943, Serial No. 502,898

5 Claims. (Cl. 308—109)

This invention relates to lubricating devices in general and in particular to a lubricator for car wheels.

In lubricating wheels, such as wheels used on mine cars, it is customary to force the lubricant into the wheel by means of a special gun. Lubrication of the wheels is frequently done while the cars are in motion and accordingly the lubricator nozzle or tip will be jabbed with considerable force into the lubricating device carried by the wheel. It is, therefore, necessary that the wheel lubricating device be made very simple and strong. It is also necessary that the lubricating device be made as cheaply as possible and applied to the wheels with a minimum of labor. It is an object, therefore, of the present invention to provide a simple lubricating device utilizing a minimum of parts and which can be cheaply and quickly applied to the wheel or other structure which is to be lubricated.

A further object of the invention is the provision of a lubricating device, all parts of which may be readily inserted into a wheel cavity and locked in place by the outer closure member for the cavity.

A still further object of the invention is the provision of a simple lubricating device insertable into a cavity and locked in place by a combination valve seat and closure member which is locked in position by a reversal of its curvature after being placed in the cavity.

These and other objects of the invention will be apparent to persons skilled in the art from a study of the following description and accompanying drawings, in which:

Figure 1 is a sectional view taken through a car wheel and showing the lubricating device applied thereto;

Fig. 2 is an end view of the device with a part of the wheel broken away to better disclose the outer closure member;

Fig. 3 is an enlarged sectional view taken at the outer end of the device and showing the parts in their preliminary assembled position, and Fig. 4 shows the parts in their final assembled position after the curvature of the closure member has been reversed.

Referring now to the drawings in detail, it will be seen that the lubricating device has been applied to a car wheel having a hub portion 2, connected to the felly 4 by spokes 6. One or more of the spokes or a part of the hub portion may be enlarged to provide a cavity 8 connected by a short passage 10 to the hub part of the wheel which will receive an axle or bearings which are mounted on the axles (not shown). The cavity is partially closed adjacent its outer end by an overhanging ledge 14 having an opening 16 formed therethrough. Outwardly of the ledge 14 the cavity decreases in diameter as at 18 thereby providing what may be termed a truncated conical surface outwardly of the ledge and forming with the ledge a substantially V-shaped groove surrounding the outer end of said cavity and having the point of the V directed away from the axis of the cavity or in other words having the wide end portion of the V opening into the cavity. The conical surface may be obtained during the casting of the wheel but is preferably machined so as to provide a smooth surface against which the outer closure member may seat.

As clearly shown, the lubricating device proper consists of an inner short spring seat and guide member 20 cast or otherwise secured in the wheel at the base of cavity 8 and adapted to receive the inner end of a spring or other resilient means 22. This spring or other means surrounds the stem of a rivet shaped valve member 24 having a spherically surfaced head portion 26 terminating in a shoulder 28 against which the outer end of the spring may seat. In order to hold the valve member and spring in place in the cavity 8, an outer closure member in the form of a flexible or deformable disc 30 is provided. This closure member, as clearly shown, is of truncated spherical form, having its side edges 32 so cut as to be substantially parallel with the truncated conical surface 18 formed at the outer end of the cavity. Centrally of the closure member 30 an opening is provided forming seating surfaces 34 against which the semi-spherical head 26 of the valve member may seat to form a lubricant retaining seal. As clearly shown in Fig. 3, the closure member or flexible disc 30 is originally so formed and placed that it is cupped inwardly toward the valve member and has a radius of curvature less than the radius of curvature of the member when in final locked position.

In assembling the device the spring and valve member are inserted through opening 16 in ledge 14 and the outer closure member or disc 30 is then inserted so that its edge portions bear against the outer surface of ledge 14, then a reversing tool T, having a tip 40 adapted to fit within the central opening of the cupped disc, is placed in the position shown in Fig. 3, after which pressure is applied to the tool to force it inwardly and cause the disc 30 to have its curvature reversed, thereby bringing the disc to the form shown in Fig. 4. It is, of course, obvious that as soon as the cupped disc has been pushed inwardly sufficient for the metal to pass the plane of the edges, it will spring or snap into the final position shown in Fig. 1. In this position the disc is locked in place since its inner surface engages the edges of ledge 14 at hole 16 and its side edges bear against the truncated conical surface 18 which overhangs the ledge 14. In the final form the closure member or disc is cupped outwardly as shown in Figs. 1 and 4 and this outwardly cupped surface of the disc will act as a guide to bring the lubricating tool into proper position to allow unseating of the valve member from the valve seat for the flow of lubricant into the cavity 8.

While the device has been described more or less in detail it will be obvious to persons skilled in the art that various modifications and rearrangements of parts may be made and all such modifications and rearrangements of parts are contemplated as will fall within the scope of the appended claims defining my invention.

What is claimed is:

1. The combination with a wheel, of a lubricating device therefor comprising, a reciprocatory valve member mounted in a lubricant receiving cavity in the wheel, a ledge overhanging and partially closing the outer end of said cavity, a truncated conical surface overhanging said ledge, and an outwardly opening cupped disc closing in part the lubricant receiving cavity and bearing on said truncated conical surface and ledge to lock the disc in the wheel, said disc being formed with a valve seat adapted to be engaged by said valve member to seal said cavity against escape of lubricant.

2. The combination with a wheel, of a lubricating device therefor comprising, a lubricant receiving cavity in the wheel formed with a substantially V-shaped groove surrounding the outer end of the cavity and having the point of the V-shaped groove directed outwardly from the axis of the cavity, a flexible outwardly opening cupped disc locked in said groove, a valve seat formed on said disc centrally thereof, and a reciprocatory valve member mounted in the lubricant receiving cavity and bearing on said valve seat to seal said cavity against escape of lubricant from the wheel.

3. The combination with a wheel, of a lubricating device therefor comprising, a lubricant receiving cavity in the wheel formed with a substantially V-shaped groove surrounding the outer end thereof with the wide portion of the V-shaped groove opening into the cavity, a flexible outwardly opening cupped disc locked in said groove, a valve seat formed on said disc centrally thereof, and a reciprocatory rivet shaped valve member mounted in the lubricant receiving cavity and having the head thereof bearing on said valve seat to seal said cavity against escape of lubricant from the wheel.

4. The combination with a wheel, of a lubricating device therefor comprising, a lubricant receiving cavity in the wheel formed with a substantially V-shaped groove surrounding the outer end thereof with the wide portion of the V-shaped groove opening into the cavity, a flexible outwardly opening cupped disc locked in said groove, a valve seat formed on said disc centrally thereof, and a reciprocatory valve member mounted in the lubricant receiving cavity and bearing on said valve seat to seal said cavity against escape of lubricant from the wheel.

5. The combination with a wheel, of a lubricating device therefor comprising, a lubricating valve member mounted in a lubricant receiving cavity in the wheel, walls defining a substantially V-shaped groove surrounding the outer end of said cavity with the wide portion of the V-shaped groove opening into the cavity, a flexible outwardly cupped disc in resilient engagement with the walls of said groove, an opening in said disc, and a valve seat formed about said opening and adapted to have sealing engagement with said valve member to seal said cavity against escape of lubricant from the wheel.

FRED J. BOGARD.

REFERENCES CITED

The following references are of record in the file of this patent:

UNITED STATES PATENTS

| Number | Name | Date |
|---|---|---|
| 870,941 | Day | Nov. 12, 1907 |
| 1,006,059 | Carr | Oct. 17, 1911 |
| 1,400,871 | Crotty | Dec. 20, 1921 |
| 1,823,618 | Magnuson | Sept. 15, 1931 |

FOREIGN PATENTS

| Number | Country | Date |
|---|---|---|
| 133,568 | Great Britain | Oct. 16, 1919 |